3,309,349
CAULKING COMPOUND COMPRISING MIXED LATICES OF ELASTOMERIC AND RESINOUS POLYMERS
Harry Greenberg, Cincinnati, Ohio, assignor to National Distillers and Chemical Corporation, New York, N.Y., a corporation of Virginia
No Drawing. Filed Mar. 20, 1958, Ser. No. 722,655
4 Claims. (Cl. 260—94.9)

This invention relates generally to a novel olefin polymerization process and to novel combination catalysts useful therefor. More particularly, the invention relates to polymerization of olefins such as ethylene at relatively low pressures and at relatively low temperatures in the presence of a noval combination catalyst.

This application is a continuation-in-part of copending application Ser. No. 557,958, filed Apr. 13, 1956, now abandoned.

This invention is based on the discovery that high density, high molecular weight, high melting, linear polyethylene polymers of substantially low ash content and outstanding physical properties can be prepared by the herein described novel process using a novel catalyst combination.

In accordance with this invention, the polymerization process is carried out in the presence of a suitable reaction medium with a catalyst which is a combination of finely divided sodium and a tetrahalide of a Group IV$b$ metal, i.e., titanium, zirconium, hafnium and thorium. In such a catalyst combination, the sodium is employed in a proportional amount of more than about one gram atom per mole of the Group IV$b$ metal tetrahalide. More specifically, the combination catalyst employed for practice of this invention comprises the aforesaid components in a ratio of about two to about four gram atoms of sodium per gram mole of the Group IV$b$ metal tetrahalide. Although, generally speaking, substantially larger proportional amounts of sodium to the aforesaid tetrahalide may be used, such as eight or more gram atoms of sodium to one gram mole of the tetrahalide, the amount of sodium employed generally need not exceed about 8 gram atoms and, more preferably not more than about 4 gram moles per mole of the tetrahalide. Moreover, and although in the use of more than 4 gram atoms of sodium, such as up to about 8 or more gram atoms, per mole of the tetrahalide generally results in production of ethylene polymers comparable to those obtained by use of more than one and up to about four gram atoms of sodium, the rate of the polymerization reaction tends to decrease when more than about 4 gram atoms of sodium per mole of the tetrahalide is employed. Thus, in preferred aspect, the invention is carried out with a catalyst in which the relative proportions of its essential components comprise from more than one to about four gram atoms of finely divided sodium per gram mole of the described metal tetrahalide.

With reference to the other component of the combination catalyst, i.e., a tetrahalide of a metal as aforedefined, the tetrachlorides of metals such as titanium and zirconium are preferred. However, and although for purposes of illustration, specific aspects of the invention are described hereinafter with use of titanium tetrachloride as the tetrahalide component of the catalyst, such usage is for purposes of illustration and not limitation as also contemplated for such a catalyst component are other halides of the Group IV$b$ metals, such as the tetrabromides, illustrative of which are the tetrabromides of titanium, zirconium, etc.

It is important in practice of this invention that the sodium component of the combination catalyst be in finely divided form and, in most instances, that it be of rather well defined characteristics as to particle size. Particularly useful for practice of the invention, with respect to the sodium component, are dispersions of sodium which contain a substantial amount of sodium particles not in excess of about 5 microns. Still, more preferably, the sodium component consists essentially of particles of sodium not in excess of about 3 microns in size with a still more particularly preferred catalyst comprising, as the sodium component, a dispersion of sodium consisting of particles of 2 to 3 microns in sizes in mixture with sub-micron size sodium partiles.

As to the total amount of catalyst utilized for the polymerization reaction, the amount employed may be varied over a rather wide range, as for example, about 0.25 to about 5% by weight based on the weight of the reaction medium (e.g., n-hexane). In preferred embodiment, however, the catalyst is used in amounts of from about 0.5 to about 1.5% by weight of the reaction medium. These polymerization catalyst combinations are believed to be novel and the results obtained therewith in the process described herein are unexpected and entirely unpredictable under the relatively mild condition employed as, when used per se, the components of the combination catalyst have been found to be ineffective as catalyst for polymerizing ethylene under the conditions of the process embodied herein.

For practice of this invention, the reaction may suitably be carried out by contacting ethylene under relatively mild conditions of temperature and pressure with the combination catalyst, the sodium component of which is a suspension of finely divided sodium in an inert hydrocarbon, as for example, an aliphatic hydrocarbon such as heptane, mineral spirits, and the like, with additional examples of suitable dispersant liquids being those disclosed hereinafter as diluents or liquid reaction mediums.

As aforestated, the process embodied herein may be carried out at relatively low temperatures and pressures. As to reaction temperatures, room temperatures (e.g., about 20° C.) may suitably be employed as well as lower temperatures, such as about −20° C. to substantially higher temperatures, such as up to about 300°C. Preferred practice utilizes a reaction temperature as low as possible commensurate with obtainment of high yields of desired polymer product and, generally suitable therefor, are use of temperatures in the range of from about 0° to about 70° C. Although the process embodied herein is carried out under pressures above atmospheric, exceptionally high pressures are not required. Thus, in general, the process is carried out with use of pressures that may range from about 25 to about 500 pounds per square inch or higher with a preferred range being from about 200 to about 300 pounds per square inch.

The polymerization reaction is carried out either in batch, semi-continuous, or continuous operations. Most conveniently, and in the preferred embodiments, the process is carried out in a diluent or liquid reaction medium, the amount not being unduly critical, but it should be at least sufficient to permit effective agitation and, preferably, to hold the major portion of the polymer in suspension. Organic solvents and/or diluents of the organic hydrocarbon class such as petroleum ether, pentane, cyclopentane, the hexanes, cyclohexanes, heptane, mineral spirits, and mixtures of these materials can be used. It is preferred that the material used be free of impurities which may react to destroy catalyst activity or which copolymerize with ethylene, that is materials such as water, alcohols, and unsaturates should be preferably absent. Thus, the diluent should essentially consist of one or more inert saturated hydrocarbons, that is, hydrocarbons devoid of olefinic unsaturation.

For this improved process, pure ethylene may be used or there may be used, equally well, a gas mixture containing major quantities of ethylene, provided no impurities are present which will destroy the catalyst and/or contaminate the polymer products. For instance, ethylene obtained by the cracking of hydrocarbon streams is satisfactory if acetylenic materials are not present.

In carrying out the herein described polymerization process, it is preferable and highly desirable to maintain the polymerization zone free of extraneous reactive gases. This can be done by keeping the reactor blanketed at all times with an inert gas, for instance, operating with an inert gas such as nitrogen or such inert gases as argon and helium. Preferably, the reactor and its contents are blanketed with ethylene gas to avoid unnecessary dilution of the reactor contents with inert gases.

In contacting the ethylene with the catalyst combinations, one suitable method is to prepare a dispersion of sodium of the suitable particle size characteristics. This can be done by initially dispersing the sodium in the reaction medium and adding the metal tetrachloride thereto. Ethylene or ethylene-containing feed is passed into the resulting dispersion or it may be present in solution before final addition of the Group IV$b$ metal tetrahalide. Absorption of ethylene starts immediately upon addition of either ethylene to the co-catalyst combination or addition of the metal tetrahalide to the alkali metal dispersion containing dissolved ethylene in solution.

Absorption is generally accompanied by a rise in temperature. When absorption has ceased or slowed down considerably, ethylene flow is stopped. The crude polymer (insoluble in heptane) is isolated by filtration of the reaction mixture followed by washing to remove catalyst, and drying.

With further reference to preparation of the novel combination catalyst embodied herein, it may be prepared prior to subjecting it to contact with the olefin to be polymerized or may, if desired, be prepared in situ. For example, the catalyst may be prepared by addition of the Group IV$b$ metal halide to a suspension of sodium of suitable particle size characteristics to provide a preformed combination catalyst for subsequent contact with the olefin. On the other hand, the combination catalyst may be prepared in situ. That is, a dispersion of finely divided sodium can be contacted with ethylene, or there can be provided a dispersion of the sodium and in which dispersion ethylene has been dissolved, followed by addition of the Group IV$b$ metal halide in appropriate amount. Studies of various methods for preparation of the combination catalyst have revealed that, in order to prepare the combination catalyst in a most active state and with obtainment of optimum results, particularly with respect to consistency of performance in catalyzing the ethylene polymerization, the Group IV$b$ metal halide should be added to the suspension of sodium particles, rather than in reverse order. Hence, and although the invention embodied herein contemplates use of a combination catalyst, containing the essential components aforedefined, that effectively catalyzes the described olefin polymerization reaction irrespective of the manner of the catalyst preparation, it is in most cases desirable and in many cases essential that it be prepared by addition of the Group IV$b$ metal halide to the sodium dispersion.

For purposes of further describing the invention, the following examples are set forth as illustrative and not limitative embodiments. In determining properties of the polymer products, such as molecular weight, softening point, and density, the determinations were made in accordance with the following:

*Molecular weights.*—Molecular weights were determined from the intrinsic viscosity of the polyethylene products (tetralin) at 105° C. The equation relating intrinsic viscosity and molecular weight is:

$$(n) = 1.35 \times 10^{-4} {}_M 0.63$$

The relationship was developed by Harris (I. Harris, J. Poly. Sci., 8, 353 (1952)) who measured viscosities at 75° in xylene. These polymers cannot be handled under these conditions because of their limited solubilities. In theory, however, the intrinsic viscosity is independent of solvent and temperature.

*Softening points.*—Because of the high molecular weight and relatively broad melting range of the majority of the polyethylene obtained, true melting points cannot be directly determined. Thus, the initial softening points were recorded. The softening point was determined by placing the specimen on a melting block and slowly increasing the temperature while constantly working the sample with a small spatula. The softening point was taken at the temperature at which a variety of properties such as general appearance, degree of granulation, cohesiveness, and gumminess underwent change at the greatest rate. In general, the softening points on polyethylene samples obtained through the use of these catalysts ranged from 130 to 140° C.

*Density.*—Densities of the polyethylenes were obtained by immersing the heat-compressed material into a series of solutions possessing different specific gravities at 25° C. The density of the solution in which the polymer neither sank nor floated, but remained suspended in the liquid, was taken as the density of the polyethylene.

In the following examples, Nos. 1 to 6, inclusive, carried out in accordance with this invention, the sodium component of the combination catalyst was finely divided sodium having a maximum particle size of about 3 microns (determined by visual examination with a calibrated eyepiece) and comprising a substantial amount of sub-micron particles.

*Example 1*

Into a 1 liter stainless steel autoclave (provided with a gas purge line, a stirrer and thermocouple well) was introduced under argon, 4.05 cc. of a dispersion containing 0.0375 gram atom of sodium in alkylate (mineral spirits), and 400 cc. of n-heptane followed by 1.5 ml. titanium tetrachloride (0.0135 mole), i.e., a ratio of 2.65 gram atoms of sodium per mol of titanium tetrachloride.

A pressure of 300 p.s.i. of ethylene was applied after purging and the polymerization reaction was initiated. The temperature of the contents of reaction vessel rose from 25° C. to about 60° C. in a period of 45 minutes during which time fresh ethylene was introduced continuously to maintain the pressure at 300 p.s.i. At the end of 70 minutes, the reaction was stopped by releasing the ethylene pressure. The contents of the autoclave was a thick semi-solid paste of polymer and catalyst, and the latter was decomposed by the addition of methanol containing about 5% HCl. There was thus produced a snow-white suspension of polyethylene which was filtered, washed with water and acetone to remove traces of inorganic material and dried in a vacuum oven to constant weight. The polymer, obtained in a yield of 53.2 grams (20 grams/gram of catalyst), had the following properties:

Molecular weight _____ About $5 \times 10^6$
Ash _____ percent__ 0.28
Softening point _____ ° C__ 138
Density _____ 0.926

In studies carried out in similar manner as set forth in Example 1, with use of 0.0375 gram atom of the finely divided sodium dispersion in 400 cc. of n-heptane and at an ethylene pressure of 350 p.s.i. for one hour, no reaction leading to polyethylene formation was observed. Similarly, in studies carried out in similar manner as set forth in Example 1, with use of 0.0135 mole of titanium tetrachloride in 400 cc. of n-heptane and ethylene at 300 p.s.i. for periods as long as 3 hours, no reaction leading to polyethylene formation was observed, thus evidencing the essentiality of use of both components in combination to provide an effective catalyst for production of the desired polymers by the reaction conditions embodied herein.

*Example 2*

Using the same apparatus as in Example 1, 400 ml. of heptane together with 0.0375 gram atom of sodium and 0.0075 mole of titanium tetrachloride (5 Na to 1 TiCl₄) were charged and heated to 95° C. The reaction with ethylene at 300 p.s.i. was carried out for 180 minutes at about 100° C. by the periodic application of heat.

On working up of the autoclave contents, as described in Example 1, a pure white product was obtained weighing 41 grams and having a molecular weight of about $2 \times 10^6$ and a softening point of 138° C.

*Example 3*

A reaction was carried out in a manner identical to that described in Example 1, except that a 4:1 ratio of sodium (dispersed in alkylate) to titanium tetrachloride was used in 400 cc. of dry deaerated alkylate. The product from the described reaction was a finely divided white polyethylene polymer weighing 35 grams, having molecular weight of about $3 \times 10^6$, and a softening point of 135° C.

*Example 4*

Polymerization of ethylene at 300 p.s.i. was carried out as in Example 1 except that the ratio of sodium to titanium chloride was 8 to 1, the catalyst being added to the autoclave as 0.075 gram atom of sodium in the form of a dispersion in 400 ml. n-heptane, followed by addition of 0.0094 mole of TiCl₄. After 3 hours' reaction time the temperature rose from 29° C. to 46° C. The autoclave was discharged and the polymer product recovered as described in Example 1.

Yield _____ gms__ [1] 75.0
Molecular weight _____ $5 \times 10^6$
Softening point _____ ° C__ 136
Ash _____ 0.044

The polymer product was a pure white polymer which could be molded under pressure at 150° C. to give a tough product possessing cold draw properties and very high flexural strength. Films pressed from this material were almost clear and especially tough.

*Example 5*

150 ml. of decalin were introduced into a stirred pressure reactor and 0.0375 gram atom of sodium (in the form of a fine dispersion in high boiling hydrocarbon solvent) was added with an additional 50 ml. of decalin. The mixture was heated and stirred under an atmosphere of argon.

When the reactor temperature reached 148° C., 0.009 mol of titanium tetrachloride in 150 ml. of decalin was added followed by a 50 ml. decalin rinse. The reactor was sealed under a slight argon pressure and heating and stirring were continued.

At a reactor temperature of 152° C. and an argon pressure of 30 p.s.i.g., ethylene was pressured into about 300 p.s.i.g. Polymerization began immediately as indicated by a pressure decrease. Reaction was continued for about 90 minutes at 141–164° C. and 190–330 p.s.i.g. The reactor was then cooled, the contents were removed, and slurried successively with methanol, water containing a small amount of detergent, methanolic hydrochloric acid, water and acetone. After drying, the solid product weighed 27.8 g., had a softening point of 133° C. and a molecular weight of 910,000 (reduced viscosity of 0.763).

*Example 6*

Titanium tetrachloride (0.009 mol) was added to 0.0375 g. atom of sodium in the form of a fine dispersion suspended in n-heptane, the operation being carried out under an argon blanketing atmosphere in a stirred glass flask at 24° C.

After about 10 minutes stirring at 24–26° C., the mixture was added to a stirred pressure reactor which has been previously flushed with argon. The reaction was then sealed under 20 p.s.i.g. of argon pressure, and the mixture was heated and stirred.

When the reactor temperature reached 202° C., the pressure was 190 p.s.i.g. Ethylene was then introduced to a total pressure of about 300 p.s.i.g. Heating and stirring were continued for about 180 minutes, ethylene being added as necessary to maintain the pressure at 275–360 p.s.i.g. while the temperature was held at 190–231° C.

The reactor was then cooled, and the product was removed and treated as in Example 5. After drying, the solid product weighed 7.8 g. and had a softening point of 145° C.

As is apparent from the foregoing, the invention described herein provides a low pressure process for polymerization of ethylene to tough, wax-like products that can be pressure molded, have satisfactorily high melting points and a relatively high molecular weight. Moreover, and of considerable importance, the process embodied herein enables the production of high molecular weight polyethylenes of low ash content as illustrated by the foregoing illustrative examples carried out in accordance with this invention and, for example, from which a high molecular weight polymer having a molecular weight of $5 \times 10^6$ was produced having an ash content as low as 0.044%.

The polymeric products which are obtained are readily and conveniently handled, and can be processed and treated in accordance with regularly accepted practice to produce, for example, elastic and flexible sheets, films and the like. The products also can be extended by suitable extrusion means or molded by injection molding. They can also be used in fiber-forming operations to obtain ribbons, filaments, and threads having high flexural and tensile strength. The polymers can be spun into fibers and filaments using the methods and techniques generally applicable to nylon type materials.

The expression "high molecular weight polyethylene" as used herein in both the specification and claims refers to polymeric products produced from ethylene by the process embodied herein that may vary over a rather wide range of molecular weight. Generally, such polymeric products are of relatively high molecular weight, such as up to about five million, as well as relatively lower molecular weight polymeric products as, for example, from about 60,000 and higher.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A polymerization process consisting essentially of polymerizing ethylene at a temperature of from about −20° C. to about 150° C. at a pressure of from about 25 to about 500 pounds per square inch with a polymerization catalyst consisting essentially of finely divided sodium, the particles of which are not substantially in excess of about 3 microns in diameter and titanium tetrachloride.

---

[1] 35 parts polymer/part catalyst.

2. A process, as defined in claim 1, wherein the polymerization reaction is carried out in the presence of an inert liquid reaction medium and the catalyst comprises finely divided sodium and the titanium tetrachloride in a proportional amount of more than one to about eight gram atoms of sodium per mole of the titanium tetrachloride.

3. A process, as defined in claim 1, wherein the polymerization reaction is carried out in the presence of an inert liquid reaction medium and the catalyst comprises sodium and titanium tetrahalide in a ratio of from more than one to about eight gram atoms of sodium per mole of titanium tetrachloride, and the sodium is in the form of a dispersion in an inert liquid in which a substantial amount of the sodium particles are of not more than about 3 microns in size.

4. A process, as defined in claim 1, in which the sodium component of the combination catalyst is a dispersion of sodium consisting essentially of sodium particles of 2 to 3 microns in size in mixture with sub-micron size particles.

References Cited by the Examiner

UNITED STATES PATENTS

| | | | |
|---|---|---|---|
| 2,721,189 | 10/1955 | Anderson | 260—94.9 |
| 2,843,577 | 7/1958 | Friedlander | 260—94.9 |
| 2,879,263 | 3/1959 | Anderson | 260—94.9 |
| 2,905,645 | 9/1959 | Anderson | 260—94.9 |
| 2,912,424 | 11/1959 | Cash | 260—94.9 |
| 2,921,058 | 1/1960 | Feller et al. | 260—94.9 |

FOREIGN PATENTS

| | | |
|---|---|---|
| 1,132,506 | 11/1956 | France. |
| 538,782 | 12/1955 | Belgium. |

OTHER REFERENCES

Principles of Chemical Engineering, by Walker, Lewis and MacAdams, McGraw-Hill Book Company, Inc., 2nd ed., 1927 (page 273 relied on) (copy in Sci. Lib.).

JOSEPH L. SCHOFER, *Primary Examiner.*

M. LIEBMAN, L. H. GASTON, B. E. LANHAM, F. L. DENSON, W. J. VAN BALEN, *Assistant Examiners.*